(12) United States Patent
Kalchbrenner et al.

(10) Patent No.: US 11,144,782 B2
(45) Date of Patent: *Oct. 12, 2021

(54) GENERATING VIDEO FRAMES USING NEURAL NETWORKS

(71) Applicant: DeepMind Technologies Limited, London (GB)

(72) Inventors: Nal Emmerich Kalchbrenner, London (GB); Aaron Gerard Antonius van den Oord, London (GB); Karen Simonyan, London (GB)

(73) Assignee: DeepMind Technologies Limited, London (GB)

( * ) Notice: Subject to any disclaimer, the term of this patent is extended or adjusted under 35 U.S.C. 154(b) by 197 days.

This patent is subject to a terminal disclaimer.

(21) Appl. No.: 16/338,338

(22) PCT Filed: Sep. 29, 2017

(86) PCT No.: PCT/US2017/054528
§ 371 (c)(1),
(2) Date: Mar. 29, 2019

(87) PCT Pub. No.: WO2018/064591
PCT Pub. Date: Apr. 5, 2018

(65) Prior Publication Data
US 2021/0019555 A1    Jan. 21, 2021

Related U.S. Application Data

(60) Provisional application No. 62/402,914, filed on Sep. 30, 2016.

(51) Int. Cl.
*G06K 9/62* (2006.01)
*G06K 9/46* (2006.01)
(Continued)

(52) U.S. Cl.
CPC ....... *G06K 9/6217* (2013.01); *G06K 9/00664* (2013.01); *G06K 9/00744* (2013.01);
(Continued)

(58) Field of Classification Search
CPC ............. G06K 9/6217; G06K 9/00664; G06K 9/00744; G06K 9/4652; G06N 3/0445; G06N 3/0454
See application file for complete search history.

(56) References Cited

U.S. PATENT DOCUMENTS 5,822,452 A   10/1998   Tarolli et al.
7,149,262 B1  12/2006   Nayar et al.
(Continued)

FOREIGN PATENT DOCUMENTS

JP   2004-348732   12/2004

OTHER PUBLICATIONS

'tinyclouds.org' [online] "Automatic Colorization," Jan. 2016 [retrieved on Oct. 3, 2017] Retrieved from Internet: URL<http://tinyclouds.org/colorize/> 13 pages.
(Continued)

*Primary Examiner* — Utpal D Shah
(74) *Attorney, Agent, or Firm* — Fish & Richardson P.C.

(57) ABSTRACT

Methods, systems, and apparatus, including computer programs encoded on computer storage media, for generating video frames using neural networks. One of the methods includes processing a sequence of video frames using an encoder neural network to generate an encoded representation; and generating a predicted next frame pixel by pixel according to a pixel order and a channel order, comprising: for each color channel of each pixel, providing as input to a decoder neural network (i) the encoded representation, (ii) color values for any pixels before the pixel in the pixel order, and (iii) color values for the pixel for any color channels
(Continued)

before the color channel in the channel order, wherein the decoder neural network is configured to generate an output defining a score distribution over a plurality of possible color values, and determining the color value for the color channel of the pixel by sampling from the score distribution.

27 Claims, 3 Drawing Sheets

(51) Int. Cl.
  *G06N 3/04* (2006.01)
  *G06K 9/00* (2006.01)
(52) U.S. Cl.
  CPC ......... *G06K 9/4652* (2013.01); *G06N 3/0445* (2013.01); *G06N 3/0454* (2013.01)

(56) References Cited

U.S. PATENT DOCUMENTS

| | | | |
|---|---|---|---|
| 7,224,735 B2 | 5/2007 | Porikli et al. | |
| 8,660,345 B1 * | 2/2014 | Fang ..................... | H04N 1/644 382/166 |
| 8,811,490 B2 * | 8/2014 | Su ......................... | H04N 19/30 375/240.16 |
| 9,773,196 B2 * | 9/2017 | Sachs ...................... | G06T 7/90 |
| 10,013,640 B1 | 7/2018 | Angelova | |
| 10,176,388 B1 * | 1/2019 | Ghafarianzadeh ... | G06N 3/0445 |
| 10,366,328 B2 * | 7/2019 | Yang .................... | G06N 3/0454 |
| 10,402,700 B2 * | 9/2019 | van den Oord ......... | G06K 9/66 |
| 2013/0215264 A1 | 8/2013 | Soatto | |
| 2016/0029031 A1 | 1/2016 | Fahn et al. | |
| 2018/0025257 A1 | 1/2018 | van den Oord et al. | |
| 2018/0336455 A1 * | 11/2018 | Kalchbrenner ...... | G06N 3/0454 |
| 2019/0362201 A1 * | 11/2019 | van den Oord ........ | G06K 9/623 |

OTHER PUBLICATIONS

'www.en.wikipedia.org' [online] "Super-resolution Imaging," Last Update Sep. 13, 2017, [retrieved on Oct. 2, 2017] Retrieved from Internet: URL<https://en.wikipedia.org/wiki/Super-resolution_imaging> 8 pages.
Dinh et al. "Nice: Non-Linear Independent components estimation," arXiv preprint arXiv. 1410.8516v6, Apr. 10, 2015, 13 pages.
EP Communication pursuant to Article 94(3) EPC in European Appln. No. 17705215.6, dated. Mar. 25, 2020, 7 pages.
Germain et al. "MADE: Masked autoencoder for distribution estimation," arXiv preprint arXiv. 1502.03509v2, Jun. 5, 2015, 10 pages.
Graves et al., "Offline handwriting recognition with multidimensional recurrent neural networks," Advances in Neural Information Processing Systems, 2009, 8 pages.
Graves. "Generating sequences with recurrent neural networks," arXiv preprint arXiv 1308.0850v5, Jun. 5, 2014, 43 pages.
Gregor et al. "Deep autoregressive networks," Proceedings of the 31st International Conference on Machine Learning, May 20, 2014, 9 pages.
Gregor et al. "DRAW: A recurrent neural network for image generation," Proceedings of the 32nd International Conference on Machine Learning, Feb. 16, 2015, 10 pages.
He et al. "Deep residual learning for image recognition," arXiv preprint arXiv 1512.03385, Dec. 10, 2015, 12 pages.
International Search Report and Written Opinion issued in International Application No. PCT/US2017/014990, dated Apr. 28, 2017, 15 pages.
International Search Report and Written Opinion issued in International Application No. PCT/US2017/054528, dated Jan. 18, 2018, 18 pages.
JP Decision to Grant a Patent in Japanese Appln. No. 2018-558109, dated Sep. 30, 2019, 5 pages. (with English translation).
Kalchbrenner et al. "Pixel recurrent neural networks," arXiv 1601.06759v3, Aug. 19, 2016, 11 pages.
Kalchbrenner et al. "Video Pixel Networks," arXiv preprint arXiv 1610.00527, Oct. 3, 2016, 16 pages.
Kingma et al. "Auto-encoding variational bayes," arXiv preprint arXiv 1312.6114v10, May 1, 2014, 14 pages.
Larochelle et al. "The neural autoregressive distribution estimator," Proceedings of the Fourteenth International Conference on Artificial Intelligence and Statistics, Jun. 14, 2011, 9 pages.
Mansimov et al. "Generating Images from Captions with Attention," arXiv 1511.02793v2, Feb. 29, 2016, 12 pages.
Murray et al. "Evaluating probabilities under high-dimensional latent variable models," Advances in Neural Information Processing Systems, 2009, 8 pages.
Neal. "Connectionist learning of belief networks," Artificial intelligence, 56(1) Jul. 1, 1992, 43 pages.
Raiko et al. "Iterative neural autoregressive distribution estimator NADE-k," Advances in Neural Information Processing Systems, 2014, 9 pages.
Rezende et al. "Stochastic backpropagation and approximate inference in deep generative models," arXiv 1401.4082v3, May 30, 2014, 14 pages.
Salakhutdinov et al. "Deep Boltzmann machines," Artificial Intelligence and Statistics, Apr. 15, 2009, 8 pages.
Salimans et al. "Markov chain monte carlo and variational inference: Bridging the gap," Proceedings of the 32nd International Conference on Machine Learning, 2015, 9 pages.
Sohl-Dickstein et al. "Deep unsupervised learning using nonequilibrium thermodynamics," arXiv. preprint arXiv 1503.03585v8, Nov. 18, 2015, 18 pages.
Stollenga et al. "Parallel multi-dimensional lstm, with application to fast biomedical volumetric image segmentation," Advances in Neural Information Processing Systems 28, 2015, 9 pages.
Sutsekever et al. "Generating text with recurrent neural networks," Proceedings of the 28th International Conference on Machine Learning, 2011, 8 pages.
Theis et al. "A note of the evaluation of generative models," arXiv preprint arXiv 1511.01844v3, Apr. 24, 2016, 10 pages.
Theis et al. "Generative Image Modeling Using Spatial LSTM' s," arXiv 1506.03478 Sep. 18, 2015, 9 pages.
Uria et al. "A deep and tractable density estimator," Proceedings of the 31st International Conference on Machine Learning, Jan. 27, 2014, 9 pages.
Uria et al. "RNADE: The real-valued neural autoregressive density-estimator," Advances in Neural Information Processing Systems, 2013, 9 pages.
Van den Oord et al. "Factoring variations in natural images with deep Gaussian mixture models," Advances in Neural Information Processing Systems, 2014, 9 pages.
Van den Oord et al. "The Student-t Mixture as a Natural Image Patch Prior with Application to Image Compression," Journal of Machine Learning Research vol. 15, Jun. 2014, 26 pages.
Written Opinion issued in International Application No. PCT/US2017/014990, dated Jan. 11, 2018, 8 pages.
Zhang et al. "Highway long short-term memory RNNs for distance speech recognition," Proceedings of the International Conference on Acoustics, Speech and Signal Processing, Mar. 2016, 5 pages.
Zoran et al. "From Learning Models of Natural Image Patches to Whole Image Restoration," IEEE International Conference on Computer Vision, Nov. 6, 2011, 8 pages.
Brabandere et al, "Dynamic Filter Networks," arXiv, Jun. 2016, 14 pages.
Chen et al, "Semantic image segmentation with deep convolutional nets and fully connected CRFs," arXiv, Jun. 2016, 14 pages.
Finn et al, "Unsupervised learning for physical interaction through video prediction," arXiv, Oct. 2016, 12 pages.
He et al, "Identity mappings in deep residual networks," arXiv, Jul. 2016, 15 pages.
Hochreiter et al, "Long short-term memory," bionf.jku.at, 1997, 32 pages.
Kalchbrenner et al, "Grid long short-term memory," arXiv, Jan. 2016, 15 pages.

(56) References Cited

OTHER PUBLICATIONS

Kalchbrenner et al, "Recurrent continuous translation models," aclweb, Oct. 2013, 10 pages.
Mathieu et al, "Deep multi-scale video prediction beyond mean square error," arXiv, Feb. 2016, 14 pages.
Oh et al, "Action-conditional video prediction using deep networks in atari games," arXiv, Dec. 2015, 26 pages.
Oord et al, "Conditional Image Generation with PixelCNN Decoders," arXiv, Jun. 2016, 13 pages.
Oord et al, "Pixel Recurrent Neural Networks," arXiv, Jan. 2016, 10 pages.
Oord et al, "Wavenet: A Generative Model for Raw Audio," arXiv, Sep. 2016, 15 pages.
Patraucean et al, "Spatio-temporal video autoencoder with differentiable memory," arVix, Sep. 2016, 13 pages.
PCT International Prelimiarny Report on Patentability in International Appln No. PCT/US2017/054528, dated Apr. 11, 2019, 12 pages.
Ranzato et al, "Video (language) modeling: a baseline for generative models of natural videos," arXiv, May 2016, 15 pages.
Shi et al, "Convolutional LSTM network: A machine learning approach for precipitation nowcasting," arXiv, Sep. 2015, 12 pages.
Srivastava et al, "Highway networks," arXiv, Nov. 2015, 6 pages.
Srivastava et al, "Unsupervised learning of video representations using lstms," arXiv, Jan. 2016, 15 pages.
Vondrick et al, "Generating videos with scene dynamics," arXiv, Oct. 2016, 10 pages.
Yu et al, "Multi-scale context aggregation by dilated convolutions," Apr. 2016, 13 pages.
EP Office Action in European Appln. No. 17790889.4, dated Aug. 21, 2020, 14 pages.
He et al., "Identity Mappings in Deep Residual Networks," ECCV 2016: Computer Vision—ECCV 2016, Lecture Notes in Computer Science, 2016, 9908:630-645.
KR Office Action in Korean Appln. No. 10-2018-7024508, dated Apr. 8, 2020, 8 pages (with English translation).
Oh et al., "Action-Conditional Video Prediction using Deep Networks in Atari Games," CoRR, Dec. 2015, https://arxiv.org/pdf/1507.08750.pdf, 26 pages.
Van den Oord et al., "Pixel Recurrent Neural Networks," CoRR, Jan. 2016, https://arxiv.org/pdf/1601.06759.pdf, 11 pages.

\* cited by examiner

GENERATING VIDEO FRAMES USING NEURAL NETWORKS

BACKGROUND

This specification relates to generating video frames using neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Some neural networks are recurrent neural networks. A recurrent neural network is a neural network that receives an input sequence and generates an output sequence from the input sequence. In particular, a recurrent neural network can use some or all of the internal state of the network from a previous time step in computing an output at a current time step.

An example of a recurrent neural network is a Long Short-Term Memory (LSTM) neural network that includes one or more LSTM memory blocks. Each LSTM memory block can include one or more cells that each include an input gate, a forget gate, and an output gate that allow the cell to store previous states for the cell, e.g., for use in generating a current activation or to be provided to other components of the LSTM neural network.

SUMMARY

This specification describes how a system implemented as computer programs on one or more computers in one or more locations can generate a predicted next video frame that is a prediction of a video frame that will follow a last video frame in a temporal sequence of video frames. The predicted next video frame includes multiple pixels, with each pixel having a respective color value for each of multiple color channels, and the pixels being ordered according to a pixel order and the color channels being ordered according to a channel order. The pixel order and the channel order can be configured, e.g., by a system designer, and various orderings of the pixels in the frame and the channels are possible.

The system includes an encoder neural network that is configured to process each video frame in the temporal sequence to generate an encoded representation of the temporal sequence of video frames. For example, the encoder neural network can include a convolutional sub-neural network followed by a convolutional long short-term memory (LSTM) sub-neural network.

The system also includes a decoder neural network that is configured to, for each color channel of each pixel in the predicted next video frame: receive an input that includes (i) the encoded representation of the temporal sequence of video frames, (ii) color values for any pixels in the predicted next video frame that are before the pixel in the pixel order, and (iii) color values for the pixel for any color channels that are before the color channel in the channel order.

The decoder neural network is configured to process the input to generate an output defining a score distribution over multiple possible color values for the color channel of the pixel. For example, the score distribution may include a respective score for each color value in a discrete set of possible color values for the channel.

The system can generate the next frame pixel by pixel by iteratively providing inputs to the decoder neural network in accordance with the pixel order and the color channel order and, for each color channel of each pixel, determining the color value for the color channel by sampling from the score distribution generated by the decoder neural network for the pixel, e.g., by sampling a color value from the possible color values in accordance with the scores in the score distribution so that each possible color value is sampled with a likelihood that is defined by the score for the color value or by selecting a highest-scoring color value.

Particular embodiments of the subject matter described in this specification can be implemented so as to realize one or more of the following advantages. The video frame generation system as described in this specification can achieve results that outperform the state of the art in accurately predicting the next video frame in a video from the currently seen video frames. In particular, the system can achieve these results because the model and the neural architecture reflect the time, space and color structure of video tensors and encode it as a four-dimensional dependency chain. The factorization of the dependency further ensures that the model stays fully tractable; the likelihood that the model assigns to a video can be computed exactly. The model operates on pixels without preprocessing and predicts discrete multinomial distributions over raw pixel intensities, allowing the model to estimate distributions of any shape. In particular, the system can achieve these state of the art results without using any specific motion priors or any surrogate losses. Because of the architecture and the dependencies, the system generates video frames that are free of artifacts and are highly detailed for many frames into the future, i.e., by continuing to append frames generated by the system to the end of temporal sequences to generate more frames.

Additionally, the video frame generation system can be configured to effectively condition predicted next video frames on actions performed by a robotic agent that is interacting with an environment.

After training, the video frame generation system can effectively generalize to the motion of novel objects, i.e., can generate video frames that accurately predict the motion of novel objects not encountered during the training.

Because of the architecture of the encoder neural network and the decoder neural network, certain operations performed by the system can be parallelized during training so that fewer computational resources are required to train the neural networks.

The disclosure may be expressed as a computer-implemented method, or as a computer system, or as a computer program product (such as one or more computer storage media) storing program instructions which cause one or more computers to perform the method, to implement the computer system.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
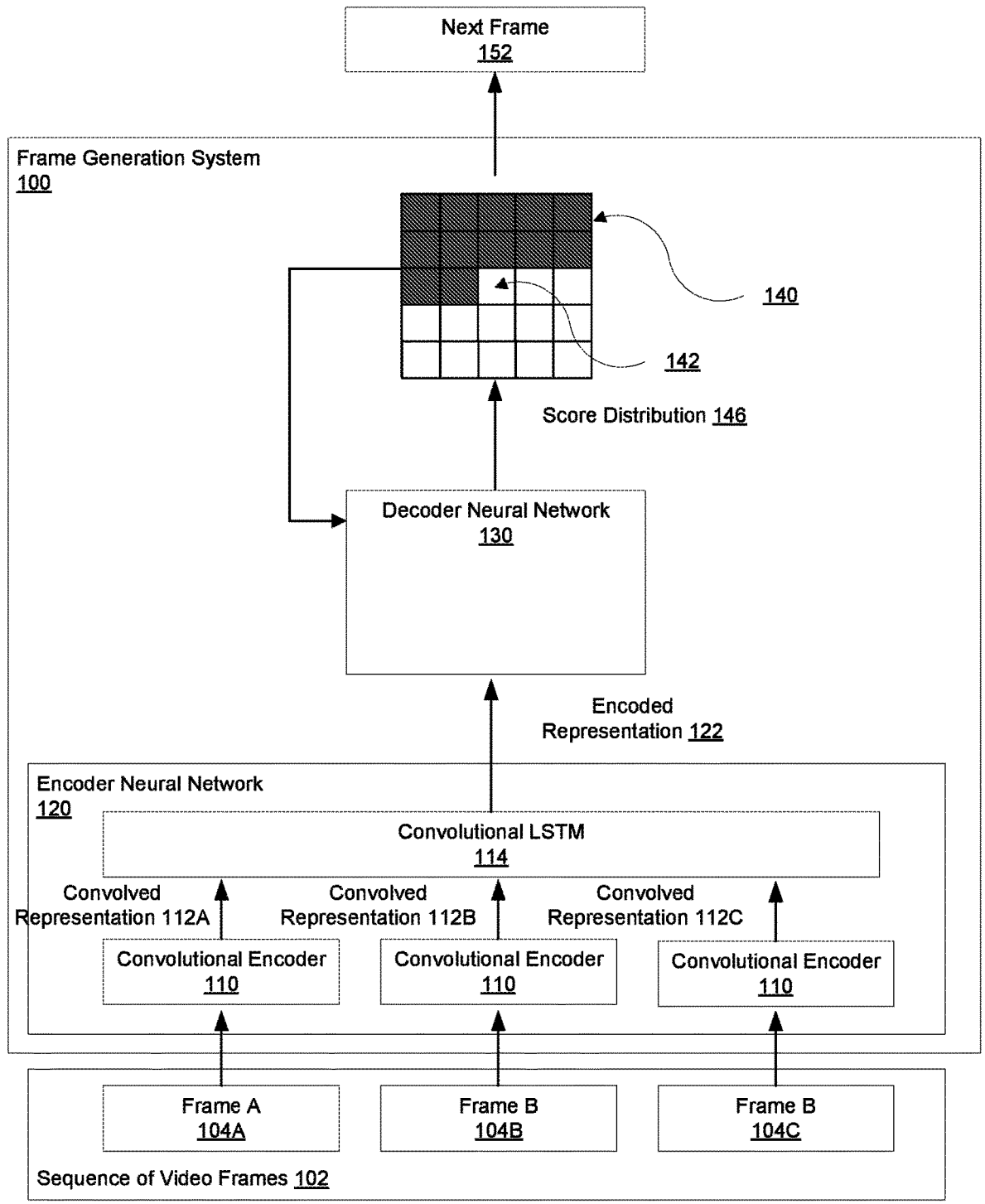
FIG. 1 shows an example video frame generation system.

FIG. 1 shows an example video frame generation system 100. The video frame generation system 100 is an example of a system implemented as computer programs on one or more computers in one or more locations, in which the systems, components, and techniques described below can be implemented.

The video frame generation system 100 receives a temporal sequence of video frames and generates a predicted video frame that is a prediction of the next video frame in the sequence, i.e., the video frame that will follow the last video frame in the temporal sequence of video frames. The sequence of video frames is referred to in this specification as a temporal sequence because the video frames in the sequence are ordered according to the time at which the frames were captured.

For example, the video frame generation system 100 can receive a video frame sequence 102 and generate a next frame 152 that is a prediction of the next video frame in the video frame sequence 102.

In particular, as will be described in more detail below, the predicted next video frame 152 generated by the system 100 includes multiple pixels, with each pixel having a respective color value for each of multiple color channels, and the pixels being ordered according to a pixel order and the color channels being ordered according to a channel order. The pixel order and the channel order can be configured, e.g., by a system designer, and various orderings of the pixels in the frame and the channels are possible.

The frame generation system 100 includes an encoder neural network 120 that is configured to process each video frame in the temporal sequence to generate an encoded representation of the temporal sequence and a decoder neural network 130 that is configured to generate the next frame from the encoded representation.

For example, the encoder neural network 120 can process the frame sequence 102 to generate an encoded representation 122 and the decoder neural network 130 can process the encoded representation 122 to generate the next frame 152.

In particular, the encoder neural network 120 can include a convolutional encoder sub-neural network 110 followed by a convolutional long short-term memory (LSTM) sub-neural network 114.

The convolutional encoder sub-neural network 110 is configured to receive an input video frame and to process the input video frame to generate a convolved representation of the input video frame that preserves the resolution of the video frame. That is, the convolved representation has the same spatial dimensions as the input video frame but may include a different number of channels from the input video frame. In other words, if the input video frame is an n by n by c tensor, the convolved representation is an n by n by d tensor, where c and d may be different.

Generally, the convolutional encoder sub-neural network 110 includes multiple resolution-preserving convolutional neural network layers. In some cases, the convolutional neural network layers in the convolutional encoder 110 are arranged into multiple residual blocks. A residual block of convolutional neural network layers is a block of layers that has a residual (additive skip) connection from the input to the block to the output of the block. Generally, residual blocks allow for easy gradient propagation through many layers of a neural network.

In some cases, some or all of the residual blocks are residual multiplicative blocks that include convolutional layers arranged into one or more multiplicative units. A multiplicative unit includes multiple convolutional layers that are each applied to the input to the multiplicative unit, e.g., in parallel.

Residual multiplicative blocks, multiplicative units, and example architectures for the convolutional encoder 110 are described in more detail below with reference to FIG. 2.

The system 100 processes each frame in the input video sequence using the convolutional encoder 110 to generate a respective convolved representation for each of the frames. For example, the system 100 can process video frames 104A-C from the video sequence 102 using the convolutional encoder 110 to generate respective convolved representations 112A-C.

The convolutional LSTM 114 is configured to receive the convolved representations for the video frames in the sequence and to process the convolved representations in sequence to generate the encoded representation of the temporal sequence. Generally, the encoded representation also preserves the resolution of the video frames in the temporal sequence. However, the encoded representation may have a different number of channels than both the convolved representations and the input frame.

For example, the convolutional LSTM 114 can receive the convolved representations 112A-C and process the convolved representation 112A-C to generate the encoded representation 122.

Generally, the convolutional LSTM 114 is a recurrent neural network that has convolutional gates and the encoded representation of the input sequence is the output of the convolutional LSTM 114 after processing the convolved representation of the last video frame in the input sequence. Convolutional LSTMs are described in more detail in Xingjian Shi, Zhourong Chen, Hao Wang, Dit-Yan Yeung, Wai-Kin Wong, and Wang-chun Woo. Convolutional LSTM network: A machine learning approach for precipitation nowcasting. In NIPS, pages 802-810, 2015.

By generating encoded representations that preserve the spatial resolution of the video frames as described above, the system 100 allows the decoder neural network 130 to condition each pixel that needs to be generated without loss of representational capacity.

The system 100 uses the decoder neural network 130 to generate the next frame from the encoded representation generated by the encoder neural network 120.

In particular, as described above, the next frame generated by the system 100 includes a predetermined number of pixels arranged in a two-dimensional map, with each pixel having a respective color value for each of multiple color channels. For example, the video frame generation system 100 can generate frames that include a red color channel, a green color channel, and a blue color channel. As a different example, the video frame generation system 100 can generate frames that include a cyan color channel, a magenta color channel, a yellow color channel, and a black color channel. The multiple color channels are arranged according to a predetermined channel order, e.g., red, green, and then blue, or blue, red, and then green.

Generally, the video frame generation system 100 generates the color values in the output frame pixel by pixel. That is, the video frame generation system 100 orders the pixels in the next frame according to a pixel order and then generates the color values for each pixel in the output frame one by one in order according to the pixel order.

For example, the pixel order may start at the top left corner of the frame and proceed row by row through the frame, with the last pixel in the pixel order being the pixel in the bottom right corner of the frame. In this example, the video frame generation system 100 first generates the color values for the top left corner pixel and then proceeds to the next pixel in the top row of the frame. However, other orderings of the pixels in the frame are possible.

Accordingly, the decoder neural network 130 is a neural network that is configured to, for each color channel of each pixel in the predicted next video frame, receive a decoder input that includes (i) the encoded representation of the temporal sequence of video frames, (ii) color values for any pixels in the predicted next video frame before the pixel in the pixel order, and (iii) color values for the pixel for any color channels before the color channel in the channel order. Thus, if the channel order is red, green, blue, for the color value for the red channel of the k-th pixel in the pixel order, the decoder neural network 130 would be conditioned on (i) the encoded representation and (ii) color values for pixels one through k−1 in the pixel order. For the color value for the blue channel of the k-th pixel in the pixel order, the decoder neural network 130 would be conditioned on (i) the encoded representation, (ii) color values for pixels one through k−1 in the pixel order, and (iii) color values for the red and green channels of the k-th pixel.

The decoder neural network 130 is configured to process the decoder input to generate an output defining a score distribution over multiple possible color values for the color channel of the pixel. For example, the score distribution may include a respective score for each color value in a discrete set of possible color values. For example, the discrete set of possible color values can be the set of integers from zero to two hundred fifty-five, inclusive, with the score distribution including a respective score for each of the integers in the set.

Generally, the decoder neural network 130 includes multiple residual blocks of convolutional neural network layers followed by an output layer, e.g., a softmax output layer, that generates the score distribution.

In particular, the convolutional neural network layers in the decoder neural network 130 are masked convolutional layers. That is, each convolutional neural network layer is configured to apply a convolution that is masked such that the score distribution for a given color channel for a given pixel is generated based only on the encoded representation and (i) color values for any pixels in the next frame that are before the given pixel in the pixel order and (ii) any color values for the given pixel for color channels before the given color channel in the channel order.

The video frame generation system 100 can implement this masking in any of a variety of ways. For example, each convolutional layer can have a kernel with the corresponding weights zeroed out.

An example of a masked convolutional decoder is described in more detail in Aaron van den Oord, Nal Kalchbrenner, and Koray Kavukcuoglu. Pixel recurrent neural networks. In ICML, volume 48, pages 1747-1756, 2016b, and Aaron van den Oord, Nal Kalchbrenner, Oriol Vinyals, Lasse Espeholt, Alex Graves, and Koray Kavukcuoglu. Conditional image generation with PixelCNN decoders. In NIPS, 2016c.

In some implementations, the decoder input for a given color channel for a given pixel is a depth concatenation of the encoded representation and a current next frame that includes only the color values that have already been generated, i.e., color values for the pixels in the next frame that are before the pixel in the pixel order and the color values for the pixel for color channels before the given color channel in the channel order. That is, the encoded representation and the current next frame are concatenated along the depth dimension to generate the decoder input.

In some other implementations, the decoder neural network 130 separately applies one or more convolutions to the encoded representation, the current next frame, or both, and then sums the resulting tensors before processing the summed tensor through the masked convolutional layers and the output layer.

The system 100 can autoregressively generate the next frame pixel by pixel by iteratively providing decoder inputs to the decoder neural network 130 in accordance with the pixel order and the color channel order and, for each color channel of each pixel, determining the color value for the color channel by sampling from the score distribution generated by the decoder neural network for the pixel, e.g., by sampling a color value from the possible color values in accordance with the scores in the score distribution so that each possible color value is sampled with a likelihood that is defined by the score for the pixel or by selecting a highest-scoring color value.

For example, when generating the color value for the first color channel in the channel order of a next pixel 142 in the output frame 152, the decoder neural network 130 can process a decoder input that includes the encoded representation 122 and a current next frame 140. As shown in FIG. 1, the shaded portion of the current next frame 140 denotes pixels for which color values have already been generated by the video frame generation system 100, while the unshaded portion of the current next frame 140 denotes pixels for which color values have not already been generated.

In the example of FIG. 1, the decoder neural network 130 processes the decoder input that includes the encoded representation 122 and a current next frame 140 to generate a score distribution 146 for the first color channel in the channel order of the next pixel 142. Once the value for the first color channel in the channel order of the next pixel 142 has been generated, the system 100 can generate a new decoder input and provide the new decoder input to the decoder neural network 130 to generate the color value for the next color channel in the channel order of the next pixel 142, and so on until the entire next frame 152 has been generated.

By conditioning the decoder neural network 130 in this manner and generating the new frame as described above, the system 100 can generate new frames that do not have artifacts, e.g., blurring of video continuations, that are present in video frames predicted by other systems that do not condition color values in the manner, e.g., that generate each pixel in the next frame independent of each other pixel.

In some implementations, the input video frames in the temporal sequence are video frames captured of an environment being interacted with by a robotic agent. For example, the video frames can be frames from a video captured by the robotic agent, i.e., by a camera attached to the robotic agent. In these cases, the system 100 can also receive, for each of the video frames, a respective action vector defining an action to be performed by the robotic agent when the environment is in the state characterized by the video frame and, optionally, a state vector characterizing the state of the robotic agent when the environment is in the state. For example, the action vectors can be desired positions of joints of the robotic agent or modifications to be made to current positions of joints of the robotic agent. When received, the state vectors can characterize the current positions of the joints of the robotic agent.

In these implementations, the system 100 uses the action vectors when predicting the next frame. In particular, when generating a next frame, the system 100 can condition the decoder neural network 130 on an action vector defining an action to be performed by the robotic agent to reach the state characterized by the next frame from the state characterized by the last frame in the input sequence. To condition the decoder neural network 130 on an action vector, the system 100 can apply a transformation to the action vector, e.g., a 1×1 convolution, to generate a feature vector and then condition the activation functions of some or all of the convolutional layers in the decoder neural network 130 on the feature vector, i.e., so that the output of the activation function depends both on the feature vector and the output of the convolution performed by the convolutional layer. An example technique for conditioning an activation function on a feature vector is described in more detail in Aaron van den Oord, Nal Kalchbrenner, Oriol Vinyals, Lasse Espeholt, Alex Graves, and Koray Kavukcuoglu. Conditional image generation with PixelCNN decoders. In NIPS, 2016c.

In some implementations, the system 100 also conditions the convolutional encoder 110 on, for each input frame, the action vector for the input frame and, optionally, the state vector for the input frame. The system 100 can perform this conditioning in the same manner as described above for the decoder neural network 130.

By conditioning the generation of the next frame on action vectors, the system 100 can more effectively model the future behavior of the environment to account for planned actions and more accurately predict the next frame.

Figure 2:
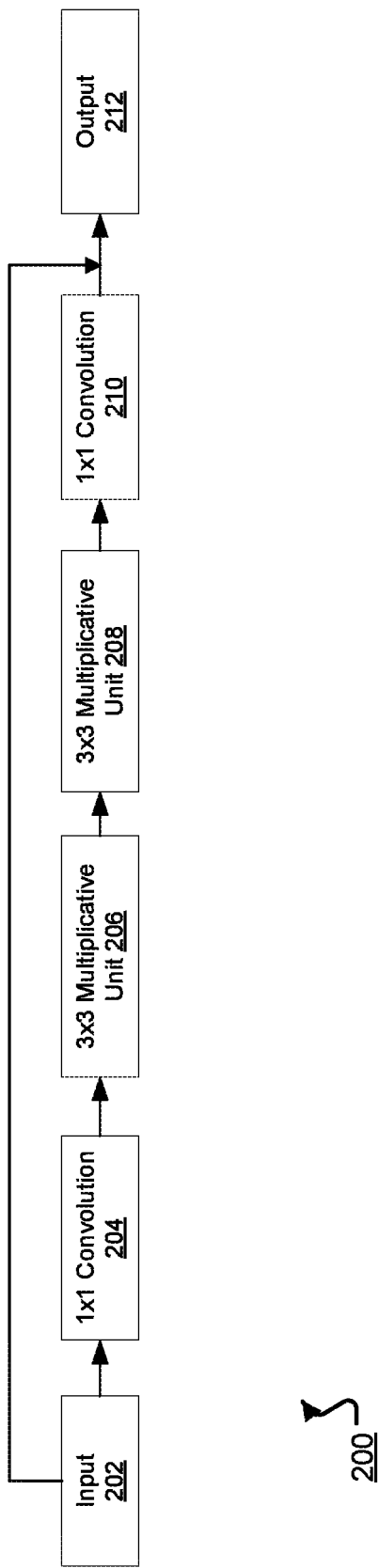
FIG. 2 shows an example residual multiplicative block.

FIG. 2 shows an example architecture of a residual multiplicative block 200 of convolutional neural network layers. For example, the block 200 can be one of the residual multiplicative blocks in the convolutional encoder sub-neural network 110 of FIG. 1.

In particular, the block 200 receives a block input 202 that has dimensions N×M×2c and generates a block output 212 that also has dimensions N×M×2c. For example, depending on the architecture of the convolutional encoder, the block input 202 can be the output generated by the previous residual block, the input frame, or an output of a different kind of layer within the convolutional encoder. The block 200 can provide the block output 212 as input to another block within the convolutional encoder or as the convolved representation for the input frame.

The block 200 applies a 1×1 convolution 204 to the block input 202 to generate an N×M×c tensor, i.e., the 1×1 convolution 204 reduces the number of channels in the input from 2c to c but preserves the spatial dimensionality of the block input.

The block 200 then applies two 3×3 multiplicative units 206 and 208 to the N×M×c tensor. Each block multiplicative unit 206, 208 is configured to process an N×M×c input tensor to generate an N×M×c output tensor.

In particular, each multiplicative unit passes the block input through four convolutional layers to create an update and three gates. When the unit is a 3×3 multiplicative unit, each of the four convolutional layers are 3×3 convolutional layers. The multiplicative unit then combines the gates, the block input, and the update to generate the block output tensor. In particular, the multiplicative unit can perform the following operations on a block input h to generate the block output MU(h):

$$g_1 = 6(\text{conv}_1(h)),$$

$$g_2 = 6(\text{conv}_2(h)),$$

$$g_3 = 6(\text{conv}_3(h)),$$

$$u = \tan h(\text{conv}_4(h)), \text{ and}$$

$$MU(h) = g_1 * \tan h(g_2 * h + g_3 * u),$$

where σ is the sigmoid non-linearity, each cony is a convolutional layer, tan h is the hyperbolic tangent non-linearity, and * denotes element-wise multiplication.

The block 200 then applies a 1×1 convolution 210 to the output of the multiplicative units to generate an N×M×2c tensor, i.e., the 1×1 convolution 210 projects the N×M×c feature map that is the output of the multiplicative unit 208 back to 2c channels.

Because the block 200 is a residual block, the block 200 then adds the block input 202 and the output of the 1×1 convolution 210 to generate the block output 212.

In some implementations, to increase the receptive field without overly increasing the computational complexity of the system, the convolutional layers in the multiplicative units within the block 200 are dilated convolutional layers. Generally, having a large receptive field helps the model to capture the motion of larger objects in the video sequence.

In general, dilated convolutional architectures have the effect of increasing the receptive field size of neurons in a convolutional network, allowing longer range interactions between neurons than would be feasible without dilation.

In some cases, each convolutional layer within a given block has the same dilation, but the dilation doubles from one block to the next up to a chosen maximum size, and then repeats. For example, one architecture of the convolutional encoder uses two repetitions of the dilation scheme [1, 2, 4, 8], for a total of 8 residual multiplicative blocks.

Figure 3:
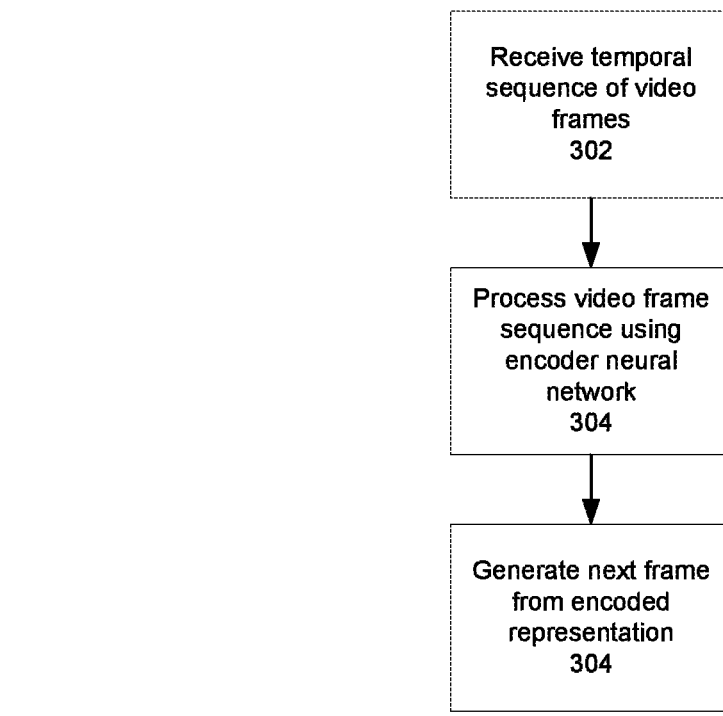
FIG. 3 is a flow diagram of an example process for generating a next frame in a temporal sequence of video frames.

FIG. 3 is a flow diagram of an example process 300 for generating a next frame. For convenience, the process 300 will be described as being performed by a system of one or more computers located in one or more locations. For example, a video frame generation system, e.g., the video frame generation system 100 of FIG. 1, appropriately programmed, can perform the process 300.

The system receives a temporal sequence of video frames (step 302).

The system processes the video frame sequence using an encoder neural network to generate an encoded representation of the sequence of video frames (step 304). In particular, as described above, the system first processes each video frame in the sequence using a convolutional encoder sub-neural network to generate a respective convolved representation for each video frame. The system then processes the convolved representations in sequence using a convolutional LSTM sub-neural network to generate the encoded representation of the sequence of video frames. In particular, the encoded representation is the output of the convolutional LSTM sub-neural network after processing the convolved representation for the last video frame in the sequence. As described above, the encoded representation generally preserves the spatial resolution of the video frames.

The system generates a next frame from the encoded representation using a decoder neural network (step 306).

In particular, the system generates the color values for each pixel in the next frame one by one in order according to the pixel order, so that color values for pixels earlier in the pixel order are generated before color values later in the pixel order. Within each pixel, the system generates the color values for the color channels of the pixel one by one according to the channel order. In particular, the system generates each color value for each pixel conditioned on (i) the encoded representation, (ii) color values for pixels before the pixel in the pixel order and (iii) color values for the pixel for any color channels before the color channel in the channel order.

Thus, the system iteratively provides decoder inputs to the decoder neural network to cause the decoder neural network to generate a score distribution over the possible color values for the current color channel. The system then selects a color value for the current color channel using the score distribution, e.g., by sampling from the score distribution so that each possible color value is selected with a likelihood that is defined by the score for the possible color value or by selecting the highest-scoring color value. The system can repeat these steps for each color channel of each pixel in the next frame according to the pixel and channel orders to generate color values for each color channel of each pixel in the next frame.

The system can perform the process 300 for input sequences for which the desired output, i.e., the next frame that should be generated by the system for the input sequence, is not known.

The system can also perform the process 300 on input sequences in a set of training data, i.e., a set of input sequences for which the next frame that should be generated by the system is known, in order to train the encoder and decoder neural networks, i.e., to determine trained values for the parameters of the encoder and decoder neural networks. The process 300 can be performed repeatedly on inputs selected from a set of training data as part of a conventional machine learning training technique to train the neural networks, e.g., a stochastic gradient descent with backpropagation through time training technique.

During training, because the output frame that should be generated is known in advance and because all of the frames in the input sequence are known at the outset, the computations performed by the encoder and decoder neural networks can be parallelized and therefore accelerated to reduce the amount of time and computing resources necessary to process a given training neural network input and, therefore, to decrease the time required for training, to improve the performance of the trained neural network, or both.

For example, the system can process each input frame using the convolutional encoder in parallel.

As another example, because the entire output image is available from the beginning of the computation, the system can perform the computations of the decoder neural network in parallel rather than iteratively providing decoder inputs to the decoder neural network. That is, the system can use color values from the known next frame in place of already generated output frame pixel color values. Because the convolutions are masked, the system can generate all of the score distributions in parallel without improperly conditioning the score distribution generated for a given color channel for a given pixel on any color values (i) for color channels after the given color channel in the channel order for the given pixel or (ii) for pixels that are after the given pixel in the pixel order.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A system implemented by one or more computers for generating a predicted next video frame that is a prediction of a video frame that will follow a last video frame in a temporal sequence of video frames, wherein the predicted next video frame comprises a plurality of pixels each having a respective color value for each of a plurality of color channels, and wherein the system comprises:
   an encoder neural network configured to:
      process each video frame in the temporal sequence to generate an encoded representation of the temporal sequence of video frames; and
   a decoder subsystem configured to generate the predicted next video frame conditioned on the encoded representation by generating the respective color values auto-regressively according to a specified order using a decoder neural network.

2. The system of claim 1, wherein the pixels are ordered according to a pixel order and the color channels are ordered according to a channel order, and wherein the decoder subsystem is configured to generate the predicted next video frame pixel by pixel according to the pixel order and the channel order by, for each color channel of each pixel,
   providing as input to the decoder neural network (i) the encoded representation of the temporal sequence of video frames, (ii) color values for any pixels in the predicted next video frame before the pixel in the pixel order, and (iii) color values for the pixel for any color channels before the color channel in the channel order; and
   determining the color value for the color channel of the pixel by sampling from the score distribution defined by the output of the decoder neural network.

3. The system of claim 1, wherein the encoder neural network comprises:
   a convolutional sub-neural network configured to, for each video frame in the temporal sequence, process the video frame to generate a convolved representation of the video frame that preserves a resolution of the video frame; and
   a convolutional long short-term memory (LSTM) sub-neural network configured to, for each video frame in the temporal sequence, process the convolved representation to generate an encoded representation that preserves the resolution of the video frames in the temporal sequence.

4. The system of claim 3, wherein the convolutional sub-neural network comprises a plurality of residual blocks of convolutional neural network layers.

5. The system of claim 4, wherein the residual blocks are residual multiplicative blocks.

6. The system of claim 4, wherein the convolutional neural network layers comprise one or more dilated convolutional neural network layers.

7. The system of claim 1, wherein the decoder neural network comprises a plurality of residual blocks of convolutional neural network layers and an output layer.

8. The system of claim 7, wherein the residual blocks are residual multiplicative blocks.

9. The system of claim 7, wherein the convolutional neural network layers comprise one or more masked convolutional neural network layers.

10. The system of claim 1,
    wherein the video frames in the temporal sequence are video frames of an environment being interacted with by a robotic agent, wherein each video frame is associated with a respective action vector defining an action to be performed by the robotic agent when the environment is in the state characterized by the associated video frame, and wherein, when generating the predicted next frame, the decoder neural network is conditioned on the action vector defining an action to be performed by the robotic agent when the environment is in the state characterized by the last video frame in the temporal sequence.

11. The system of claim 10, wherein the encoder neural network is conditioned on action vectors and, optionally, on state vectors characterizing states of the robotic agent.

12. A method of generating a predicted next video frame that is a prediction of a video frame that will follow a last video frame in a temporal sequence of video frames, wherein the predicted next video frame comprises a plurality of pixels each having a respective color value for each of a plurality of color channels, and wherein the method comprises:
    processing the temporal sequence of video frames using an encoder neural network, wherein the encoder neural network is configured to:
       process each video frame in the temporal sequence to generate an encoded representation of the temporal sequence of video frames; and
    generating the predicted next video frame conditioned on the encoded representation by generating the respective color values auto-regressively according to a specified order using a decoder neural network.

13. The method of claim 12, wherein the encoder neural network comprises:
    a convolutional sub-neural network configured to, for each video frame in the temporal sequence, process the video frame to generate a convolved representation of the video frame that preserves a resolution of the video frame; and
    a convolutional LSTM sub-neural network configured to, for each video frame in the temporal sequence, process the convolved representation to generate an encoded representation that preserves the resolution of the video frame.

14. The method of claim 13, wherein the convolutional sub-neural network comprises a plurality of residual blocks of convolutional neural network layers.

15. The method of claim 14, wherein the residual blocks are residual multiplicative blocks.

16. The method of claim 14, wherein the convolutional neural network layers comprise one or more dilated convolutional neural network layers.

17. The method of claim 12, wherein the decoder neural network comprises a plurality of residual blocks of convolutional neural network layers and an output layer.

18. The method of claim 17, wherein the residual blocks are residual multiplicative blocks.

19. The method of claim 17, wherein the convolutional neural network layers comprise one or more masked convolutional neural network layers.

20. The method of claim 12, wherein the video frames in the temporal sequence are video frames of an environment being interacted with by the robotic agent, wherein each video frame is associated with a respective action vector defining an action to be performed by the robotic agent when the environment is in the state characterized by the associated video frame, and wherein, when generating the predicted next frame, the decoder neural network is conditioned on the action vector defining an action to be performed by the robotic agent when the environment is in the state characterized by the last video frame in the temporal sequence.

21. The method of claim 20, wherein the encoder neural network is conditioned on action vectors and, optionally, on state vectors characterizing states of the robotic agent.

22. One or more non-transitory computer-readable storage media storing instructions that when executed by one or more computers cause the one or more computers to perform operations for generating a predicted next video frame that is a prediction of a video frame that will follow a last video frame in a temporal sequence of video frames, wherein the predicted next video frame comprises a plurality of pixels each having a respective color value for each of a plurality of color channels, the operations comprising:
  processing the temporal sequence of video frames using an encoder neural network, wherein the encoder neural network is configured to:
    process each video frame in the temporal sequence to generate an encoded representation of the temporal sequence of video frames; and
  generating the predicted next video frame conditioned on the encoded representation by generating the respective color values auto-regressively according to a specified order using a decoder neural network.

23. The non-transitory computer-readable storage media of claim 22, wherein the encoder neural network comprises:
  a convolutional sub-neural network configured to, for each video frame in the temporal sequence, process the video frame to generate a convolved representation of the video frame that preserves a resolution of the video frame; and
  a convolutional LSTM sub-neural network configured to, for each video frame in the temporal sequence, process the convolved representation to generate an encoded representation that preserves the resolution of the video frame.

24. The system of claim 4, wherein the residual multiplicative block comprise one or more multiplicative units, each multiplicative unit including multiple convolutional neural network layers that are each applied to an input to the multiplicative unit.

25. The system of claim 1, wherein the decoder neural network is configured to, for each color channel of each pixel in the predicted next video frame:
  receive an input comprising (i) the encoded representation of the temporal sequence of video frames, (ii) color values for any pixels in the predicted next video frame that are before the pixel in the pixel order, and (iii) color values for the pixel for any color channels that are before the color channel in the channel order; and
  process the input to generate an output defining a score distribution over a plurality of possible color values for the color channel of the pixel.

26. The method of claim 12, wherein the pixels are ordered according to a pixel order and the color channels are ordered according to a channel order, and wherein generating the predicted next video frame comprises generating the predicted next frame pixel by pixel according to the pixel order and the channel order, comprising:
  for each color channel of each pixel,
    providing as input to a decoder neural network (i) the encoded representation of the temporal sequence of video frames, (ii) color values for any pixels in the predicted next video frame that are before the pixel in the pixel order, and (iii) color values for the pixel for any color channels that are before the color channel in the channel order,
      wherein the decoder neural network is configured to receive the input and process the input to generate an output defining a score distribution over a plurality of possible color values for the color channel of the pixel, and
    determining the color value for the color channel of the pixel by sampling from the score distribution defined by the output of the decoder neural network.

27. The non-transitory computer-readable storage media of claim 22, wherein the pixels are ordered according to a pixel order and the color channels are ordered according to a channel order, and wherein generating the predicted next video frame comprises generating the predicted next frame pixel by pixel according to the pixel order and the channel order, comprising:
  for each color channel of each pixel,
    providing as input to a decoder neural network (i) the encoded representation of the temporal sequence of video frames, (ii) color values for any pixels in the predicted next video frame that are before the pixel in the pixel order, and (iii) color values for the pixel for any color channels that are before the color channel in the channel order,
      wherein the decoder neural network is configured to receive the input and process the input to generate an output defining a score distribution over a plurality of possible color values for the color channel of the pixel, and
    determining the color value for the color channel of the pixel by sampling from the score distribution defined by the output of the decoder neural network.

* * * * *